(12) United States Patent
Wills

(10) Patent No.: US 6,342,158 B1
(45) Date of Patent: Jan. 29, 2002

(54) FILTER ELEMENTS

(75) Inventor: Marvin Wills, Hampshire (GB)

(73) Assignee: Fairex Microfiltrex Limited

( * ) Notice: Subject to any disclaimer, the term of this patent is extended or adjusted under 35 U.S.C. 154(b) by 0 days.

(21) Appl. No.: 09/447,061

(22) Filed: Nov. 22, 1999

(30) Foreign Application Priority Data

Nov. 21, 1998 (GB) .............................................. 9825489

(51) Int. Cl.⁷ .......................... B01D 29/50; B01D 29/52
(52) U.S. Cl. .................... 210/323.2; 210/232; 210/240; 210/340; 210/455
(58) Field of Search ................................ 210/232, 239, 210/240, 323.2, 340, 345, 346, 445, 450, 455

(56) References Cited

U.S. PATENT DOCUMENTS

| | | | | |
|---|---|---|---|---|
| 2,709,525 A | * | 5/1955 | Beyer et al. ............. | 210/323.2 |
| 4,003,727 A | | 1/1977 | O'Dell ........................ | 55/377 |
| 4,105,562 A | * | 8/1978 | Kaplan et al. ........... | 210/323.2 |
| 4,134,836 A | * | 1/1979 | Rowley et al. ............. | 210/232 |
| 4,298,474 A | * | 11/1981 | Sillers, Jr. ................. | 210/323.2 |
| 4,522,717 A | * | 6/1985 | Brust ....................... | 210/323.2 |
| 4,997,561 A | * | 3/1991 | Schutz ..................... | 210/323.2 |
| 5,882,510 A | * | 3/1999 | Basse et al. ............. | 210/323.2 |
| 6,007,718 A | * | 12/1999 | Booth ...................... | 210/323.2 |

FOREIGN PATENT DOCUMENTS

| | | |
|---|---|---|
| GB | 936490 | 9/1963 |
| GB | 1381557 | 1/1975 |

* cited by examiner

*Primary Examiner*—John Kim
(74) *Attorney, Agent, or Firm*—Baker Botts LLP

(57) ABSTRACT

A filter assembly comprises a tube plate supporting the open ends of a plurality of substantially tubular filter elements, the filter elements being provided in groups of three, the elements of each group being connected one to another in the group by three support strips, and the arrangement being such that any group of elements can be detached from the tube plate and replaced by the same or a replacement group without detaching or cutting away the other groups of elements from the tube plate.

14 Claims, 4 Drawing Sheets

Figure 1:
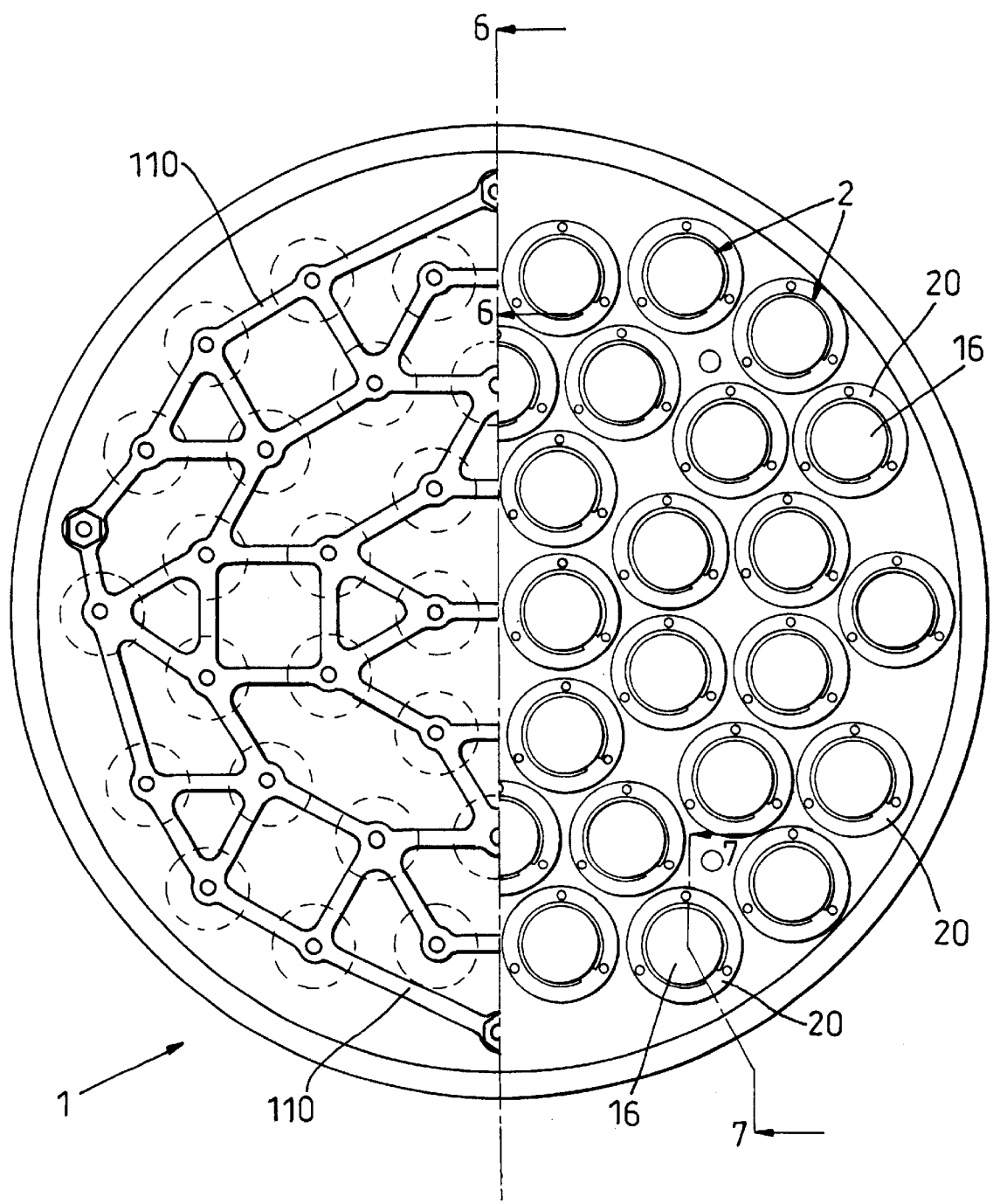

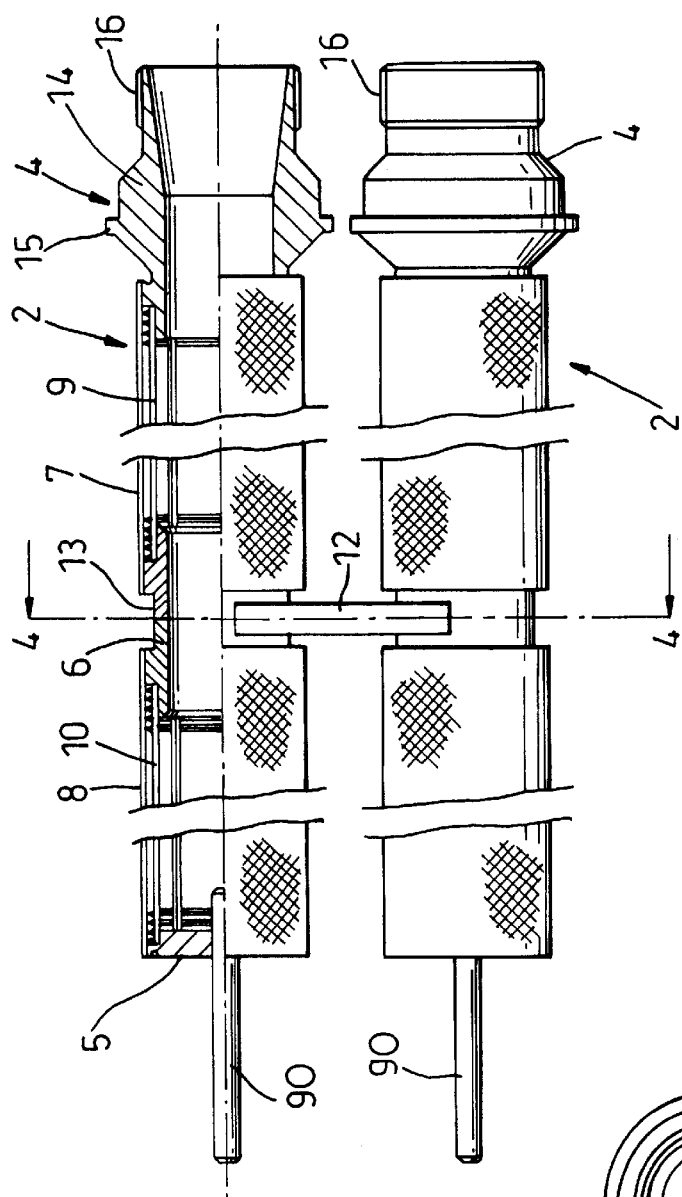
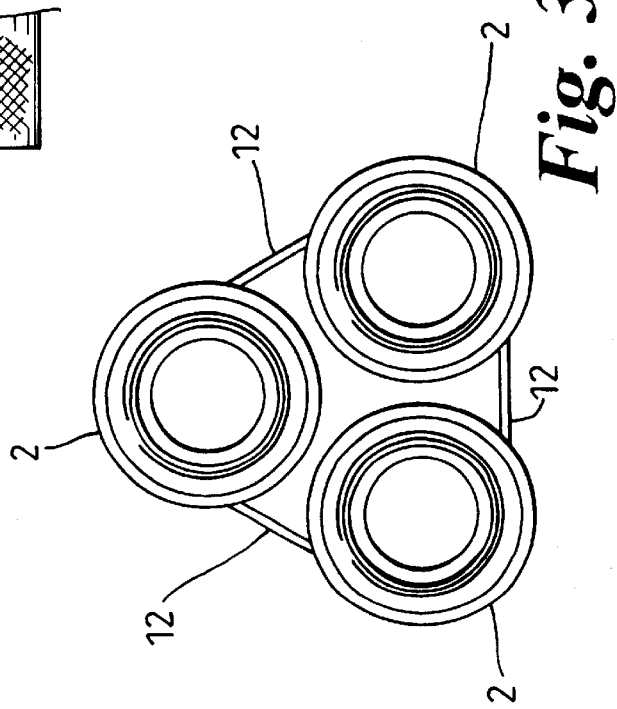

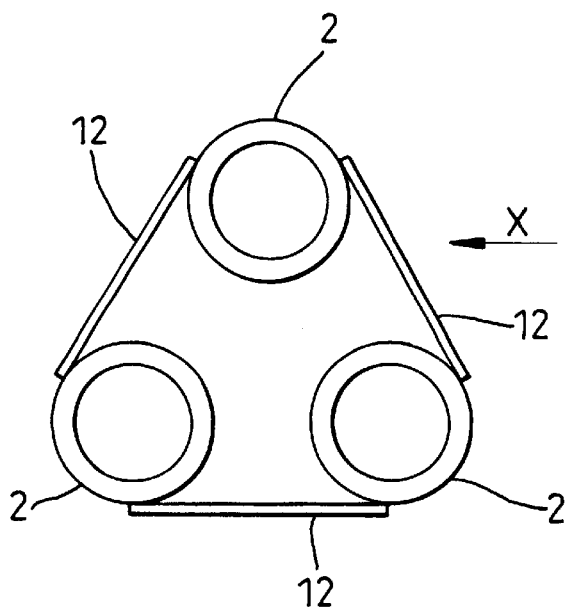
Fig. 4
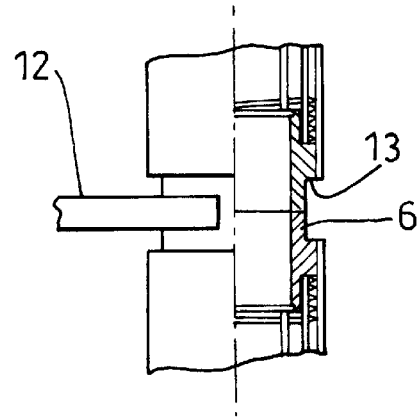
Fig. 5
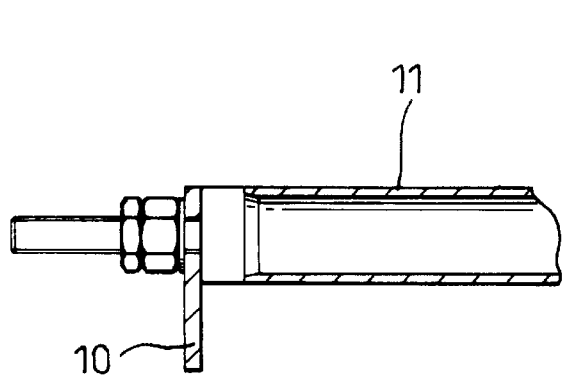
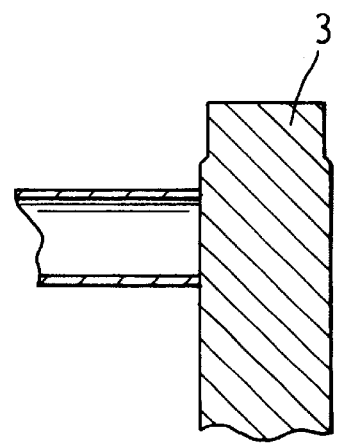
Fig. 6

FILTER ELEMENTS

This invention relates to filter elements and particularly to filter elements of the substantially tubular or candle type adapted to be supported at one end thereof by a tube plate, the tube plate being provided with a series of apertures for mounting a plurality of the filter elements.

The present invention stems from work to reduce the cost of filter maintenance in a situation in which downtime during filter repair or replacement is to be minimised and to facilitate access to filters. That situation arises for example in a large filter unit provided for large-scale industrial filtration.

In an existing unit in which the individual filter elements are each threadedly connected to the tube plate and are braced by interconnecting struts, it is necessary to cut away several elements to gain access to an element that has developed a fault before replacing the faulty element and the ones that have been cut away to gain access.

According to the invention a filter assembly comprises a tube plate supporting the open ends of a plurality of substantially tubular filter elements, the filter elements being provided in groups, the elements of each group being connected one to another in the group, and the arrangement being such that any group of elements can be detached from the tube plate and replaced by the same or a replacement group without detaching or cutting away the other groups of elements from the tube plate.

Although the elements are connected together in groups this need not affect the substantially uniform distribution of the elements across the area of the tube plate.

The connections between elements of a group are preferably provided at an intermediate position in the length of the filter elements, and preferably at substantially the midpoint in the length of the filter elements.

Each filter element preferably comprises a tube plate connector adapted to extend through a respective aperture in the tube plate, a blind end piece closing the e n d of the filter element remote from the tube plate connector, an intermediate tubular connector, and two cylindrical filter screens, a first of the filter screens extending between the tube plate connector and the intermediate connector, and the second filter screen extending between the tube plate connector and the blind end piece.

The tube plate connector preferably comprises a tubular spigot portion adapted to be received in a tube plate aperture, and an externally-threaded tubular portion axially adjacent to the spigot portion on the side towards the free end of the spigot portion.

Such a tube plate connector can be used to secure th e filter element to the tube plate by inserting the free end of the tube plate connector into the tube plate aperture, without any need for substantial turning of the filter element, applying a locking ring or nut to the free end of the tube plate connector, and by tightening of the locking ring, one or more suitable annular seals being provided between the tube plate connector and the tube plate, the arrangement being such that on tightening of the locking ring the element is secured firmly to the tube plate and a seal is effected between the tube plate and the exterior of the tubular spigot portion.

Preferably two substantially flat annular seals a reprovided, effecting a double seal arrangement, the arrangement comprising a single flat seal being provided between the locking ring and the tube plate, and a single flat seal being provided between the tube plate and the tubular spigot.

When each filter element comprises an intermediate tubular connector, the connections between elements of a group are preferably in the form of bridging elements extending between the intermediate tubular connectors.

The bridging elements are preferably welded to the intermediate tubular connectors and are preferably received at their opposed ends in external annular recesses provided in the intermediate tubular connectors.

The blind end piece of each element is preferably provided with an axially projecting pin adapted to be received in a respective aperture in a locating spider which helps to locate the closed ends of the filter elements.

Figure 7:
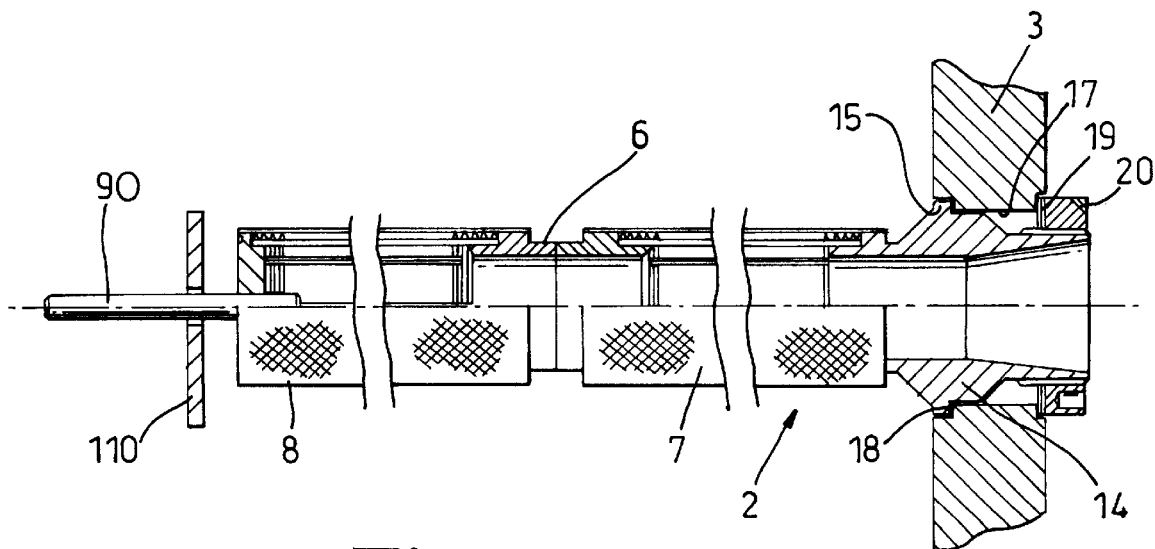
Figure 8:
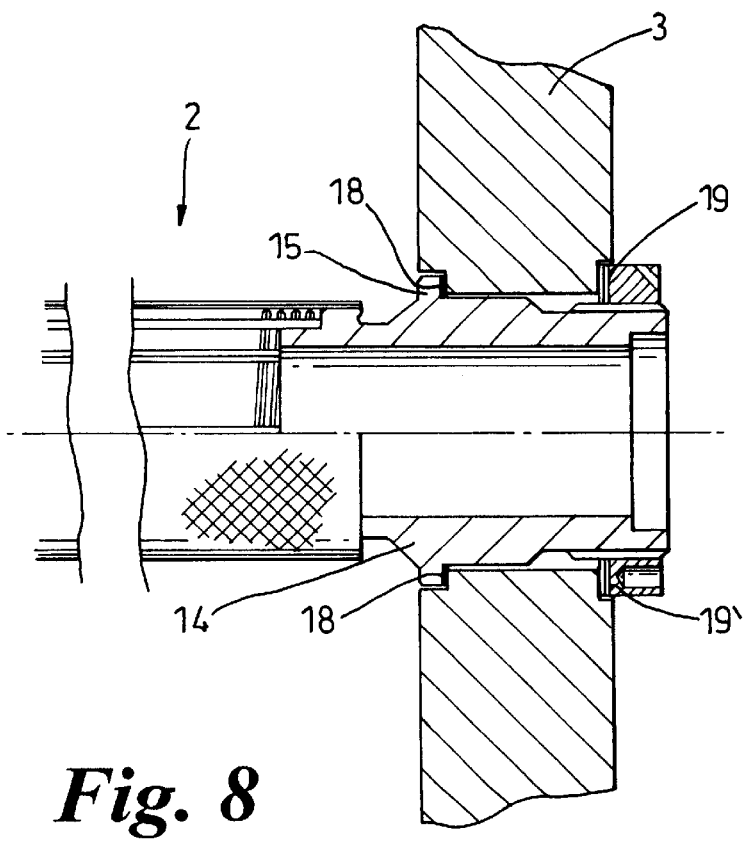

A filter assembly in accordance with the invention will now be described, by way of example only, with reference to the accompanying drawings, in which:

FIG. 1 is a composite view showing in the left half an underplan view of the spider and tube plate of the filter assembly, the filter elements being indicated in broken outline, and in the right half a plan view of the filter assembly showing the upper side of the tube plate, the locking rings and upper ends of the filter elements, FIG. 2 is a side elevation looking in the direction of the arrow X in FIG. 4, on a larger scale than FIGS. 1 and 4, of a group of three filter elements of the assembly, one of the elements being omitted for clarity, and the upper element being part-sectioned on a diameter, FIG. 3 is an end view of the group, looking from the right in FIG. 2, FIG. 4 is a section on the line 4—4 of FIG. 2 but on a smaller scale, FIG. 5 is a part view on arrow X of FIG. 4 to show the welded connection between a connecting strap and an intermediate tubular connector, the filter element being shown in longitudinal section in the right-hand half, FIG. 6 is a longitudinal cross-section on line 6—6 of FIG. 1 to show one of the four spider supporting tubes, FIG. 7 is a part-sectioned local cross-section on the line 7—7 of FIG. 1, and FIG. 8 is the right half of the part-sectional local cross-section of FIG. 7 showing the sealing arrangement in more detail The filter assembly 1 comprises a cylindrical filter housing, not shown, in which is housed a plurality of cylindrical or candle type filter elements 2 which are suspended from a circular horizontal tube plate 3 which partitions the upper end of the filter housing in well-known manner. The filter elements 2 are typically 1500 mm long.

Each filter element comprises at its upper (in use) end a tube plate connector 4, at its lower (in use) end a blind end piece 5, an intermediate tubular connector 6, first and second cylindrical filter screens 7 and 8, and first and second tubular screen support structures 9 and 10 respectively which provide structural internal support for first and second screens respectively. The components 4 5 and 6 are of stainless steel, and the screens 7 and 8 are welded thereto.

An axially-directed locating pin 90 is secured in a bore in end piece 5 and is received in a corresponding hole provided in a locating spider 110 which laterally locates the lower ends (in use) of the filter elements 2.

Spider 110 is supported by three tubular supports 11, FIG. 6, which are welded at their upper (in use) ends to tube plate 3.

Groups of three of the elements 2 are connected together by three support strips 12, of cross-sectional dimensions typically 3 mm×12 mm, which are welded to the intermediate connectors 6, as shown in FIGS. 2, 4 and 5, the opposite ends of the strips being received in external annular recesses 13 in the mid-region of the intermediate connectors 6.

The tube plate connectors 4 each comprise a spigot portion 14 backed by an annular flange 15, and an externally-threaded extremity 16 of reduced diameter as compared with spigot portion 14.

Spigot portion 14 is a push-fit in the corresponding hole 17 in the tube plate 3, and a respective internally-threaded locking ring 20 is secured on the extremity 16 to clamp the connector 6 to the tube plate, annular seals 18, 19, being provided to effect a seal between the filter element and the tube plate 3.

Seals 18, 19 are single flat annular seals forming a double seal assembly between the upstream pressure and downstream pressure.

Seal 18 is disposed between the annular flange 15 and the tube plate 3.

Seal 19 includes a flat annular thrust washer 191 disposed between the seal 19 and the locking ring 20.

The rings 20 are wired to one another for security of retention.

In the event of failure of a particular filter element, the relevant assembly/group of three filter elements can readily be replaced, simply by removing the spider 110, unscrewing the three locking rings securing the three filter elements of the group, and withdrawing the group from the plate 3. Thus the other filter elements are not disturbed by this procedure The illustrated filter elements employ filter screens 7, 8 of metal fibres, but other configurations of filter screen would be possible.

The illustrated filter assembly is suitable for use in large industrial-scale dust particle filtration.

What is claimed is:

1. A filter assembly, comprising:

a tube plate supporting the open ends of a plurality of substantially tubular filter elements, each filter element comprising a tube plate connector adapted to extend through a respective aperture in the tube plate, a blind end piece closing the end of the filter element remote from the tube plate connector, an intermediate tubular connector, and two cylindrical filter screens, a first of the filter screens extending between the tube plate connector and the intermediate connector, and the second filter screen extending between the intermediate connector and the blind end piece, the tube plate connector comprising a tubular spigot portion adapted to be received in a tube plate aperture, and an externally-threaded tubular portion axially adjacent to the spigot portion on the side towards the free end of the spigot portion, the filter elements being provided in a plurality of groups, the filter elements of each group being permanently connected one to another in the group by bridging elements welded at opposite ends thereof to adjacent filter elements, and the arrangement being such that any group of filter elements can be detached from the tube plate and replaced by the same or a replacement group without detaching or cutting away the other groups of filter elements from the tube plate.

2. A filter assembly as claimed in claim 1 in which the connections between the filter elements of each group are provided at an intermediate position along the lengths of the filter elements.

3. A filter assembly as claimed in claim 2 in which the connections are provided at substantially the midpoint in the length of the filter elements.

4. A filter assembly as claimed in claim 1 in which a locking ring or nut is applied to the free end of the tube plate connector, one or more annular seals being provided between the tube plate connector and the tube plate, and the arrangement being such that on tightening of the locking ring the filter element is secured firmly to the tube plate and a seal is effected between the tube plate and the exterior of the tubular spigot portion.

5. A filter assembly as claimed in claim 4 in which two substantially flat annular seals are provided, effecting a double seal arrangement, the arrangement comprising a single flat seal being provided between the locking ring and the tube plate, and a single flat seal being provided between the tube plate and the tubular spigot.

6. A filter assembly comprising a tube plate supporting the open ends of a plurality of substantially tubular filter elements, the filter elements being provided in a plurality of groups, the filter elements of each group being permanently connected one to another, and the arrangement being such that any group of filter elements can be detached from the tube plate and replaced by the same or a replacement group without detaching or cutting away the other groups of filter elements from the tube plate, and each filter element having a tube plate connector adapted to extend through a respective aperture in the tube plate, the tube plate connector including a tubular spigot portion adapted to be received in a tube plate aperture, an externally-threaded tubular portion axially adjacent to the spigot portion on the side towards the free end of the spigot portion, a locking ring or nut applied to the free end of the tube plate connector, and one or more annular seals between the tube plate connector and the tube plate, the arrangement being such that on tightening of the locking ring the filter element is secured firmly to the tube plate and a seal is effected between the tube plate and the exterior of the tubular spigot portion.

7. A filter assembly as claimed in claim 6 in which the connections between the filter elements of each group are provided at an intermediate position along the lengths of the filter elements.

8. A filter assembly as claimed in claim 7 in which the connections are provided at substantially the midpoint in the length of the filter elements.

9. A filter assembly as claimed in claim 6 in which each filter element further includes a blind end piece closing the end of the filter element remote from the tube plate connector, an intermediate tubular connector, and two cylindrical filter screens, a first of the filter screens extending between the tube plate connector and the intermediate connector, and the second filter screen extending between the intermediate connector and the blind end piece.

10. A filter assembly as claimed in claim 9 in which the blind end piece of each filter element is provided with an axially projecting pin adapted to be received in a respective aperture in a locating spider which helps to locate the closed ends of the filter elements.

11. A filter assembly as claimed in claim 6 in which two substantially flat annular seals are provided, effecting a double seal arrangement, the arrangement comprising a single flat seal being provided between the locking ring and the tube plate, and a single flat seal being provided between the tube plate and the tubular spigot.

12. A filter assembly as claimed in claim 6 in which the bridging elements are received at their opposite ends in external annular recesses provided in the intermediate tubular connectors.

13. A filter assembly, comprising:

a tube plate supporting the open ends of a plurality of substantially tubular filter elements, each filter element comprising a tube plate connector adapted to extend through a respective aperture in the tube plate, a blind end piece closing the end of the filter element remote from the tube plate connector, an intermediate tubular connector, and two cylindrical filter screens, a first of the filter screens extending between the tube plate connector and the intermediate connector, and the second filter screen extending between the intermediate connector and the blind end piece, the filter elements being provided in a plurality of groups, the filter elements of each group being permanently connected one to another in the group by bridging elements welded at opposite ends thereof to adjacent filter elements, the bridging elements being received at their opposite ends in external annular recesses provided in the intermediate tubular connectors, and the arrangement being such that any group of filter elements can be detached from the tube plate and replaced by the same or a replacement group without detaching or cutting away the other groups of filter elements from the tube plate.

14. A filter assembly as claimed in claim 13, in which the blind end piece of each filter element is provided with an axially projecting pin adapted to be received in a respective aperture in a locating spider which helps to locate the closed ends of the filter elements.

* * * * *

UNITED STATES PATENT AND TRADEMARK OFFICE
CERTIFICATE OF CORRECTION

PATENT NO. : 6,342,158 B1 Page 1 of 1
DATED : January 29, 2002
INVENTOR(S) : Marvin Wills It is certified that error appears in the above-identified patent and that said Letters Patent is hereby corrected as shown below:

<u>Title page,</u>
Item [73], Assignee should read as follows: -- Fairey Microfiltrex Limited --

Signed and Sealed this

Sixteenth Day of July, 2002

*Attest:*

*Attesting Officer*

JAMES E. ROGAN
*Director of the United States Patent and Trademark Office*